United States Patent
Voigtlaender et al.

(10) Patent No.: US 9,018,823 B2
(45) Date of Patent: Apr. 28, 2015

(54) APPARATUS AND METHOD FOR ELECTROMECHANICAL POSITIONING

(75) Inventors: Bert Voigtlaender, Juelich (DE); Peter Coenen, Juelich (DE); Vasily Cherepanov, Juelich (DE)

(73) Assignee: Forschungszentrum Juelich GmbH, Juelich (DE)

( * ) Notice: Subject to any disclaimer, the term of this patent is extended or adjusted under 35 U.S.C. 154(b) by 278 days.

(21) Appl. No.: 13/138,379

(22) PCT Filed: Mar. 6, 2010

(86) PCT No.: PCT/DE2010/000246
§ 371 (c)(1),
(2), (4) Date: Aug. 29, 2011

(87) PCT Pub. No.: WO2010/105592
PCT Pub. Date: Sep. 23, 2010

(65) Prior Publication Data
US 2011/0304241 A1 Dec. 15, 2011

(30) Foreign Application Priority Data
Mar. 18, 2009 (DE) .......... 10 2009 013 849

(51) Int. Cl.
*H02N 2/04* (2006.01)
*G01Q 10/04* (2010.01)
*B82Y 35/00* (2011.01)
*H02N 2/02* (2006.01)

(52) U.S. Cl.
CPC .............. *G01Q 10/04* (2013.01); *B82Y 35/00* (2013.01); *H02N 2/025* (2013.01)

(58) Field of Classification Search
CPC ............ H02N 2/025; H02N 2/026; G02B 7/08
USPC ......................... 310/323.17, 323.02
See application file for complete search history.

(56) References Cited

U.S. PATENT DOCUMENTS

| | | | | |
|---|---|---|---|---|
| 4,874,979 | A | * | 10/1989 | Rapp .................. 310/328 |
| 5,568,004 | A | | 10/1996 | Kleindiek |
| 5,907,212 | A | | 5/1999 | Okada |
| 5,994,820 | A | | 11/1999 | Kleindiek |

(Continued)

FOREIGN PATENT DOCUMENTS

| | | |
|---|---|---|
| CN | 1619938 | 5/2005 |
| CN | 1996737 | 7/2007 |

(Continued)

OTHER PUBLICATIONS

"Mounts for Exchangeable Tips and Tube Scanners" IBM Technical Disclosure Bulletin, International Business Machines Corp. (Thornwood), US, vol. 33, No. 10A, Mar. 1, 1991 p. 277/278 xp000110039 ISSN: 0018-8689.

(Continued)

*Primary Examiner* — Derek Rosenau
*Assistant Examiner* — Bryan Gordon
(74) *Attorney, Agent, or Firm* — Jordan and Hamburg LLP

(57) ABSTRACT

Provided is a device comprising at least one tubular piezo element for the electro mechanical positioning of a slider within the piezo element. The device has least one elastic friction means for exerting a normal force on the slider, the friction means being connected to the piezo element. A method for controlling the device is also disclosed.

13 Claims, 8 Drawing Sheets

(56) References Cited

U.S. PATENT DOCUMENTS

| | | | | |
|---|---|---|---|---|
| 6,048,307 | A | * | 4/2000 | Grundl et al. ............... 600/146 |
| 2002/0000518 | A1 | * | 1/2002 | Oudshoorn et al. ..... 250/454.11 |
| 2005/0006981 | A1 | * | 1/2005 | Audren et al. ............... 310/311 |

FOREIGN PATENT DOCUMENTS

| | | |
|---|---|---|
| CN | 101286712 | 10/2008 |
| CN | 100547899 | 10/2009 |
| CN | 102376696 | 3/2012 |
| DE | 43 29 163 | 3/1995 |
| DE | 44 40 758 | 5/1996 |
| DE | 693 02 084 | 9/1996 |
| EP | 1 826 551 | 11/2005 |
| JP | 7/264886 | 10/1995 |
| JP | 9-504449 | 5/1997 |
| JP | 2002-233171 | 8/2002 |
| JP | 2004-108979 | 4/2004 |
| WO | WO-94/06160 | 3/1994 |
| WO | WO-95/06428 | 3/1995 |
| WO | WO-2006/057300 | 6/2006 |
| WO | WO-2012/019477 | 2/2012 |

OTHER PUBLICATIONS

Review of Scientific Instruments 80, 085104 (2009) "A simple, compact, and rigid piezoelectric step motor with large step size", pp. 085104-1 to 085104-4, Qi Wang and Qingyou Lu; http://dx/doi/org/10.1063/1.3197381; Published by the American Institute of Physics.
Comments on "A nanopositioner for scanning probe microscopy: The KoalaDrive" [Rev. of Sci. In strum. 83, 023703 (2012)] Qingyou Lu, Qi Wang, and Yubin Hou, pp. 1 to 5.

* cited by examiner

APPARATUS AND METHOD FOR ELECTROMECHANICAL POSITIONING

BACKGROUND OF THE INVENTION

The invention relates to a device and a method for electromechanical positioning.

Such devices are used for positioning probes in the nanometer range, for example in scanning probe microscopy. They convert an electric input variable (voltage) into a mechanical output variable (position). To this end, a piezo element, which is for example tubular, is actuated so as to move a slider, which is a wire serving as the probe, that can be moved in the interior of the piezo element, relative to the tubular frictional surface by means of an inertial drive. In order to bring about this movement, a sawtooth-shaped voltage curve can be applied to the tubular piezo element. The voltage is applied between an inner and an outer electrode of the piezo element so that the voltage curve results in alternating adhesion and sliding of the slider in the piezo element. The slider adheres to the friction surface on the inside of the piezo element during the flat edges of the sawtooth pulse and glides during the steep edges thereof.

The drawback is that fast movements during the sawtooth pulses at the piezo elements can lead to undesirable shaking of the support of the piezo element, or of the moving object.

The drive that is described, including the piezo element, is disclosed in WO 94/06160 A1, for example. The slider can be moved with a precision as fine as the nanometer range. The slider that is mentioned is made of a wire. The force with which the slider is pressed against the frictional surface is critical for the function of the inertial drive. On the wire or slider, this force is effected by directly bending the wire. The exact force must be empirically adjusted by various steps of bending the wire. This is a drawback because it is a time-consuming and difficult step. During the scanning tunneling microscopy, the end of the wire forms the scanning tip or probe. A disadvantage is that, each time the tip is replaced, the entire slider must be replaced and the force must be readjusted for the replaced slider. Under vacuum, it is almost impossible to replace the slider because the needle-shaped slider does not comprise a device for removing it from the tubular frictional surface.

A slider is known from the published prior art, DE 44 40 758 A1, comprising a mass unit including a bending element, whereby the intensity of the frictional force can be adjusted via the bending of the bending element. Heavier objects can thus be positioned as well.

The drawback of this positioning unit is that little space is available for handling the device. The available space is limited because the positioning unit must be constructed as small as possible so as to achieve the greatest possible stability and high natural frequencies for the device during operation. The drawback is that the mass unit, which ultimately determines the positioning, is obliquely inclined against the tubular frictional surface and the tubular piezo element. This disadvantageously means that the mass unit is not axially aligned with the frictional surface and the tubular piezo element. In addition, the inclined arrangement of the mass unit leads to imprecise guidance and unintentional variation in the friction properties. This variation in the friction properties impairs the function of the inertial drive and can lead to failure of the positioning unit because the slider may become jammed.

The inertial drive as such also has disadvantages. In the inertial drive, the mass of the piezo element and the mass of the slider move at high accelerations. The disadvantage is that the accelerations are transmitted, in the form of shaking and vibration, to objects fastened to the slider. In addition, these forces on the piezo element are also transmitted to the support according to Newton's third law. Shaking movements can thus also be transferred to a base plate to which the nanopositioner is fastened.

A different positioning unit using a different drive method is thus disclosed in U.S. Pat. No. 4,874,979. An inner cylinder, serving as the slider, is held alternately by three piezo-electrically driven clamps. The spacing of the clamps is adjusted by the expansion or contraction of the piezo element and results in directed movement of the inner cylinder. This nanomanipulator advantageously avoids the fast accelerations of the inertial drive. However, a drawback is that at least one of the clamps must always be subject to high voltage so as to hold the inner cylinder. The holding of the cylinder by the clamps is a necessary prerequisite for driving the positioning unit, which is also referred to as an "inchworm". With the "inchworm", a voltage must be constantly applied to the piezoelectric clamps so as to hold the slider. However, when the positioning unit is used in a scanning tunneling microscope, this voltage for clamping the slider can disadvantageously transfer electric interference to the measured tunnel current. In order to prevent this, the noise of the high voltage must be very low, for example <1 mV. This entails added complexity and costs in producing a stable voltage supply.

SUMMARY OF THE INVENTION

It is the object of the invention to provide a device for the electromechanical positioning device of a slider, which is small and easy to handle, and additionally allows exact guidance of a slider within a tubular piezo element, independently of the drive that is selected. It is a further object of the invention to provide a method for controlling such devices which, as differs from the known inertial drive, operates without shaking.

The device comprises at least one tubular piezo element for the electromechanical positioning of a slider within the piezo element. The piezo element comprises electrodes and terminals for actuation.

The device comprises at least one elastic means that is connected to the piezo element for exerting a normal force on the slider within the piezo element. The elastic means comprises a frictional surface. This frictional surface forms the contact surface between the elastic means and the slider. In one embodiment of the invention, the elastic means comprises a conductive material, for example copper-beryllium. Given the conductivity, the tunneling current discharged through the scanning tip can be discharged directly via the means, and evaluated.

The elastic means can be bent so as to exert the normal force. The means according to the invention can be, for example, a cable connection which is able to exert a spring force as the normal force on the slider by means of curved internal parts. The elastic means can also be a leaf spring. Any elastic means advantageously applies a constant, permanent normal force on the slider.

In terms of the material for the means, copper-beryllium advantageously has high elasticity. It is comparatively hard and easy to process so as to configure it into a curved elastic means. This can be done by notching a tubular means, for example. In addition, it is electrically conductive. Other materials having comparable properties may be used.

In addition to the elastic means, it is also possible to use static friction means, which are directly or indirectly connected to the piezo element, for guiding the slider and absorbing normal forces. The static means comprises a frictional surface. This friction surface forms the contact surface between the static means and the slider. Sapphire hemispheres constitute a possible embodiment of static friction means. Hereinafter, static friction means and elastic friction means are referred to as friction means.

The friction means, which are fastened at an axial position of the piezo element, form a group of friction means. A group accordingly comprises at least one single friction means. During axial expansion or contraction of the piezo element, the friction means of a group are moved synchronously.

One or a plurality of friction means can be directly connected to the piezo element. This can preferably also be connected indirectly to the piezo element by way of a connecting element.

For example, generally short tubes and disks, which are connected to one end of the piezo element, are possible connecting elements. A short connecting element is referred to hereinafter as a terminal disk. The disk comprises an opening. The disk preferably comprises a ceramic material. The slider is guided or positioned in the terminal disk, or in the opening thereof. Moreover, long tubular connecting elements are referred to hereinafter as coaxial mounts, and effect a synchronous movement of a plurality of friction means. Connecting elements as such are not in contact with the slider during guidance of the slider, instead only the friction means disposed on the connecting elements make contact.

The friction means are disposed on the inside surface of the connecting elements. As tubes and disks, the connecting elements comprise an opening in which the slider is axially guided. Because the friction means are oriented towards the interior of the piezo element, in terms of the forces they exert, the slider is axially positioned through the opening of the connecting elements. The friction means are connected to the connecting element by means of a contact adhesive, for example, and are connected in this way to the inside surface of the piezo element.

Friction means can be fastened to the terminal disk and to the coaxial mount, as connecting means, and can be connected to the piezo element by way of this mount. The coaxial mount is disposed coaxially over almost the entire length of the piezo element. The slider is guided particularly advantageously in a very stable manner in the coaxial mount. The coaxial mount can be integrally designed. It is connected to the piezo element only at one end. The coaxial mount can be connected at one end to the piezo element by means of the terminal disk, which serves as the connecting element. The other end of the coaxial mount is present within the piezo element in a free state, which is to say, not fastened. Additional friction means can be disposed over the longitudinal direction of the coaxial mount.

In one embodiment of the invention, the slider is guided by friction means located in a coaxial mount. Thus, during movement of the piezo element, which is fastened to a base plate at one end, all friction means are moved synchronously. In order to position the slider, the piezo element is displaced in the known manner by an inertial drive using a sawtooth voltage. During the flat edge of the sawtooth signal, all frictional surfaces are subject to static friction and the slider follows the piezo movement. During the steep edge of the sawtooth signal, the frictional surfaces transition to kinetic friction. Given the inertia, the slider does not follow the movements of the friction means, of the coaxial mount, and of the piezo element.

The attachment of the coaxial mount to the piezo element at an end effects a complete transfer of the movement of the piezo element to the slider that is guided in the coaxial mount.

As a connecting element, the terminal disk is particularly advantageously also used to adapt the piezo elements, which may be produced as standard parts, and the tubular coaxial mounts disposed parallel thereto, to one another in terms of the inside and/or outside diameters. The elastic means for exerting the normal force on the slider is preferably connected to the piezo element by means of a contact adhesive at the connecting elements, disk and coaxial mount.

The friction means can be connected to the coaxial mount over the length thereof, at two or more axially different positions. The friction elements are preferably uniformly distributed over the entire length of the coaxial mount.

Advantageously, five or more friction means are disposed in at least two axial positions on the coaxial mount. The slider is thus held and guided in a particularly stable manner. At least one of the at least five friction means must be an elastic means, preferably in the center of the coaxial mount. The friction means that are disposed close to the terminal disk and those disposed on the opposite side at the end of the coaxial mount can, for example, be static friction means. A single elastic means for exerting the normal force can be disposed in the center of the coaxial mount. The two terminal static friction means can, of course, be replaced by elastic friction means. The friction means disposed at an axial position are preferably azimuthally uniformly distributed relative to one another. The friction means disposed in the different axial positions should likewise be azimuthally uniformly distributed relative to one another. This advantageously ensures axial guidance of the slider in the piezo element and through the openings of the connecting elements.

Very advantageously, plug connections for wires are used for guiding and axially positioning the slider. In an advantageous embodiment of the invention, these plug connections comprise elastic spring elements having frictional surfaces, for example resulting from one or more notches. At the same time, the plug connections also comprise static or additional resilient, preferably curved, frictional surfaces in which the slider can be guided. Acting as an elastic spring, the inwardly curved notch presses a slider against these guide surfaces of the connection.

It is important that the friction means are disposed relative to one another on the coaxial mount and on the disk so that the slider is guided with precision, without jamming or shifting. This is ensured by an azimuthal arrangement of the friction means.

The device is advantageously also suited to position non-cylindrical sliders. The slider used can therefore have a cross-sectional surface that differs from a circular shape. A non-cylindrical slider can be cut away, for example, along the longitudinal extension thereof, so as to prevent an azimuthal rotation of the slider during the axial translational movement. The cross-sectional surface of the slider can also be variable in the axial direction so as to position, for example, a conical slider. This can be used, for example, in order to design different speeds in the two axial directions (forward and back).

In a particularly advantageous embodiment of the invention, the device comprises at least two piezo elements that are connected to one another in an electrically insulated manner. The two piezo elements are disposed inside one another, or one after the other, and jointly comprise at least three groups of friction means, which are fastened to the piezo elements at various axial positions. At least one group of these comprises at least one elastic friction means. This means exerts the normal force on the slider.

The piezo elements are connected to one another, for example by means of an insulating adhesive or by means of an insulating connection element, for example a terminal disk having an opening, which is made of a ceramic material, for example. Static, non-elastic friction means for absorbing the normal force that is exerted on the slider can likewise be provided. The friction means, which are fastened at an axial position on the piezo elements, again form a group of friction means. These should be disposed preferably azimuthally relative to one another and to the friction means of other groups. On one hand, tubular piezo elements can be employed for the method for positioning a slider, as is described hereafter, and secondly other types of piezo elements can also be employed for this method.

Advantageously both piezo elements comprise, at an end, a connecting element having an opening. Advantageously, at least one friction means for guiding the slider is provided on this connecting element. This device comprises three groups of friction means disposed axially over the length of the piezo element. A group denotes one or more friction means that are fastened, directly or indirectly, to the piezo element at a certain axial position. All the friction means of a group are moved synchronously. In this embodiment of the invention, each of two groups of friction means is disposed on the piezo elements, at an end, and the third group is disposed in the region of the connection.

The two piezo elements are preferably connected to one another by a disk having an opening, on which at least one inwardly projecting fastened friction means is disposed or fastened. The opening of this disk is disposed axially aligned with the openings of the two other opposing terminal disks. This ensures axial guidance of the slider at all three openings of the connecting elements. Two piezo elements disposed one after the other can thus be connected to one another by a connecting element. It is also possible to connect two piezo elements disposed inside one another, each having a different outside radius and different length, by way of a connecting element.

One end of the piezo elements which are connected to one another is fastened to a base plate. The group fastened to this end thus always remains at rest.

Devices according to the invention that comprise two such piezo elements advantageously allow a higher degree of freedom in the selection of the drive. Voltages can be applied to the electrodes of the two piezo elements, which ensure movement of the slider without jerky motions such as those found with sawtooth voltage and inertial drive. It is particularly advantageous that this effects positioning of the slider in a manner that is subject to significantly less interference than with inertial drive.

According to a method for positioning a slider in such a device comprising two piezo elements that are disposed one after the other, or inside one another, a voltage curve is applied to the electrodes of the two piezo elements, such that a contraction or expansion of the piezo elements causes axial positioning of the slider. In one step of the method, one of the two movable groups of friction means is moved axially and the slider is held by the two other groups during this movement. In a second step, the other one of the two groups is moved individually. In a further step of the voltage curve, both movable groups are moved simultaneously and the slider follows the movement. The slider is moved by the simultaneous, synchronous action of two of the three groups, because the sum of the normal forces of these two groups is greater than the normal force of the individual group. The method is advantageous over the prior art because three groups of friction means permanently clamp the slider in place, without electric voltage having to be applied for this purpose. A device comprising two piezo elements that are disposed inside one another, or one after the other, should preferably comprise at least 5 friction means. This method for positioning a slider is based on an interaction between static friction and kinetic friction at the frictional surfaces between the slider and the three groups of friction means. During synchronous movement of two groups, the friction means maintain static friction with respect to the slider. When only one group is moving, the group transitions to kinetic friction.

The positioning unit that is controlled by this method is less complex and smaller than the "inchworm". The positioning unit according to the invention fits in a tubular piezo element having an outside diameter of 3 millimeters, while the "inchworm" typically has a diameter of 10 mm. The positioning unit according to the invention also contains fewer and simpler piezo elements, which is to say only two instead of three in the "inchworm", and thus also has simpler actuation. In addition, the device according to the invention and the method according to the invention also lead to major advantages in the new positioning unit as compared to inertial drives. The drive according to the invention, for example, is independent of the mass of the slider. In the inertial drive, the inertia of the slider is defined by the mass of the slider and forms an important parameter during the transition from static friction to kinetic friction. The "slip-stick" inertial drive functions flawlessly only with the mass of the slider in a narrow range. Advantageously, the movements can be carried out at arbitrarily slow velocities in the method according to the invention, without impairing the functional principle. In addition to the mode of the nanopositioners described here, operation in an inertial translation mode is advantageously possible without conversions, should this mode be desired.

The exact distance of a translation step is often difficult to reproduce in a nanopositioner that operates according to the principle of inertial translation and has a wide variance. In the nanopositioner according to the invention, the increment of a period of the movement is always the same and corresponds to the stroke of a piezo element. The clamping force with which the slider is held is relatively small in nanopositioners that operate based on inertial translation. The inertial force is determined by the mass of the slider. This force is likewise small for the desired small sizes. With the inertial drive, only small clamping forces can thus be employed. The slider does not slide with large clamping forces. Larger clamping forces can be employed with the nanopositioner according to the invention, which advantageously results in greater stability of the nanopositioner with respect to vibrations. Moreover, this measure allows greater forces to be exerted during nanopositioning.

Advantageously it is ensured in all devices according to the invention that the slider is very precisely axially mounted as a rigid unit. The contact surfaces between the slider and the friction means are designed to be very uniform and defined, preferably approximately azimuthal for each group and optionally also among one another. For this reason, the force that is exerted on the slider by the elastic means is always uniform and defined. The slider can advantageously be particularly easy to replace.

Positioning units according to the invention that comprise elastic means on the piezo elements are used as the core of a scanning probe microscope. The nanopositioner according to the invention can be used for the purpose of positioning in very small increments, as small as the nanometer range. A continuous movement in the xy direction (<~1 μm) is possible by way of quadruple segmentation of the piezo elements along the longitudinal axis.

The invention will be described in more detail hereafter based on several exemplary embodiments and the attached figures.

These devices comprising two piezo elements can advantageously be disposed in, or on, an additional, larger piezo element, or can be connected thereto. The larger piezo element effects the continuous precision movement in the xyz directions by continuous voltages on the piezo elements, while the two piezo elements disposed inside one another or one after the other bring about the coarse incremental drive in the z-direction.

DESCRIPTION OF THE PREFERRED EMBODIMENTS

FIGS. 1, 2, 5 and 6 are rough schematic longitudinal sections of four embodiments of devices P1 and P2 as well as P3 and P4 according to the invention. The remaining FIGS. 3, 4, 7 and 8 show applications.

The assemblies for controlling the electrodes at the respective tubular piezo elements by way of sawtooth pulses are not shown in FIGS. 1 to 4. When the piezo element is contracted or expanded slowly, the slider follows (static friction); with fast contraction or expansion, the slider remains at the location thereof due to inertia (kinetic friction).

Figure 3:
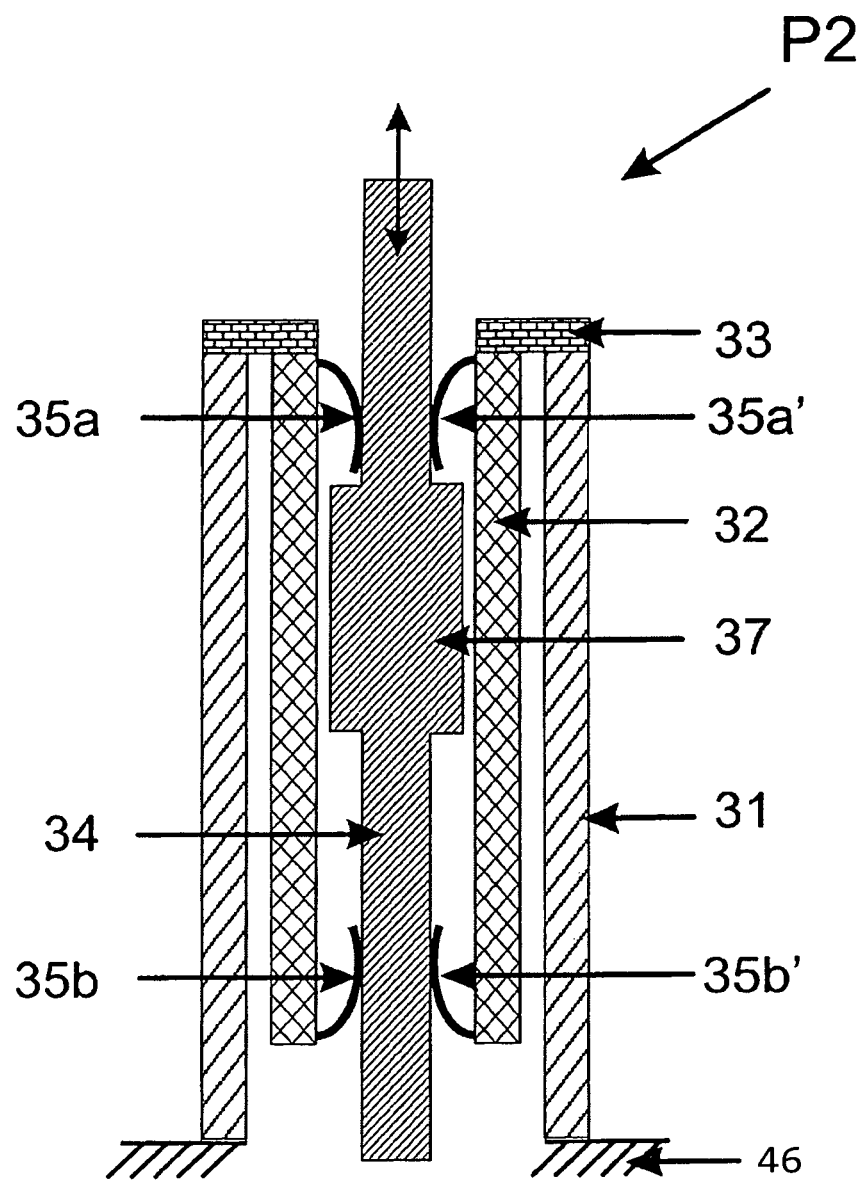
FIG. 3: is a third exemplary embodiment of a device P2 as in FIG. 2, however, with the addition of the mass unit 37.
Figure 4:
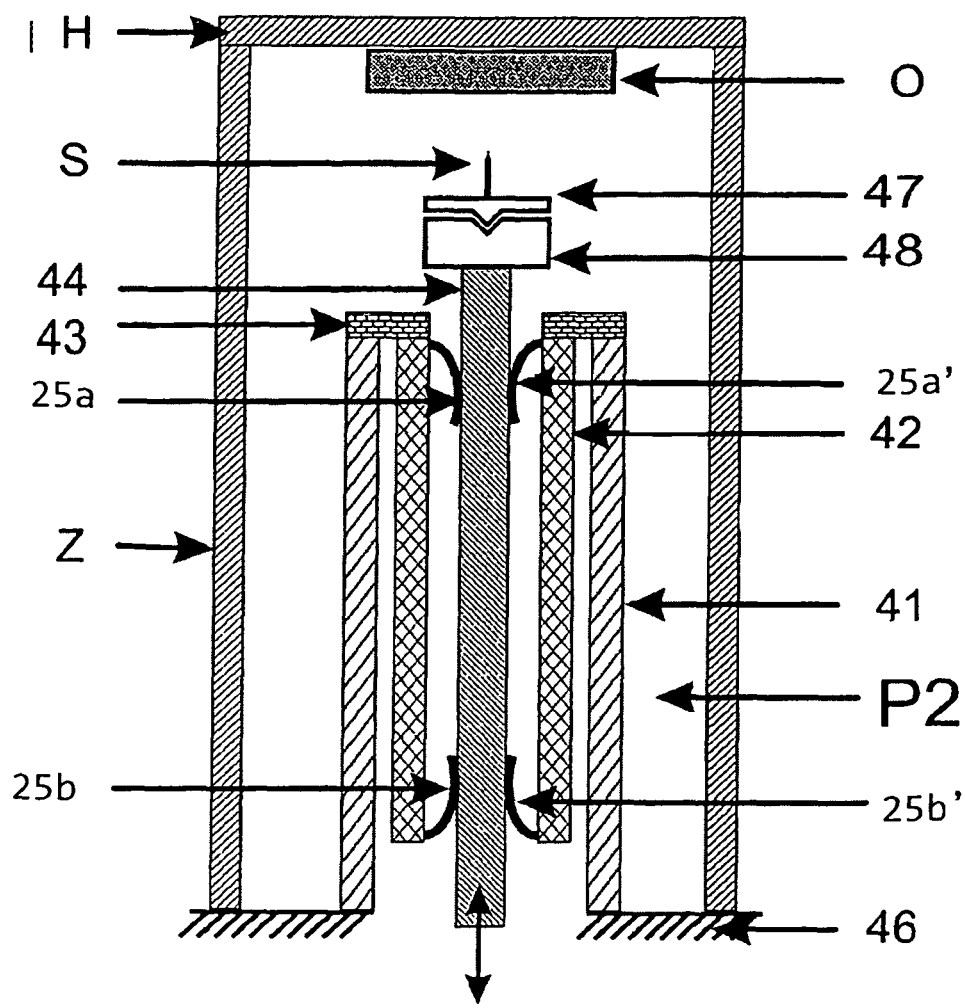
FIG. 4: use of the device P2 according to FIG. 2 in a scanning probe microscope.
Figure 5:
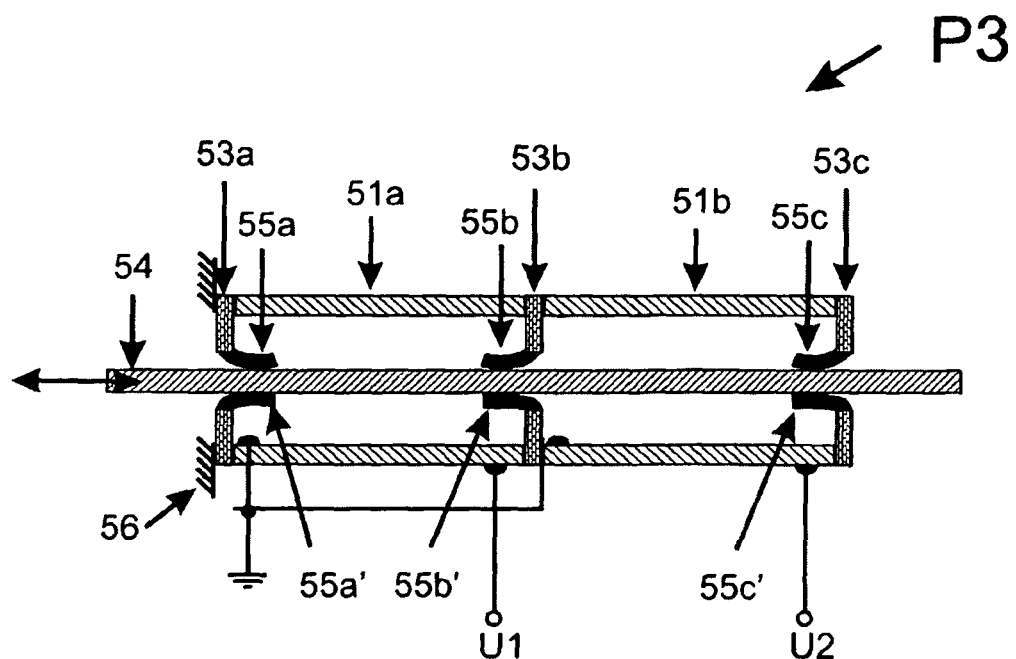
FIG. 5: shows two tubular piezo elements (top) that are disposed one after the other and electrically insulated from one another, for forming a device P3 and a voltage curve (bottom) for the particularly uniform positioning of a slider without shaking.
Figure 5:
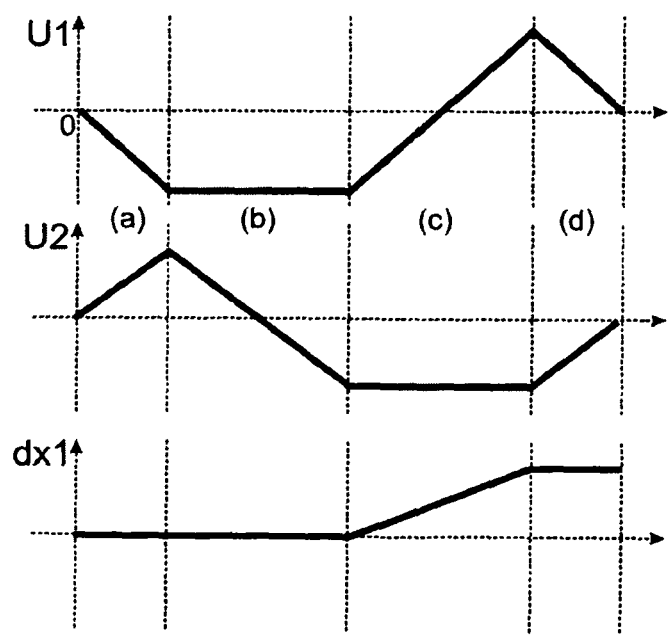
Figure 6:
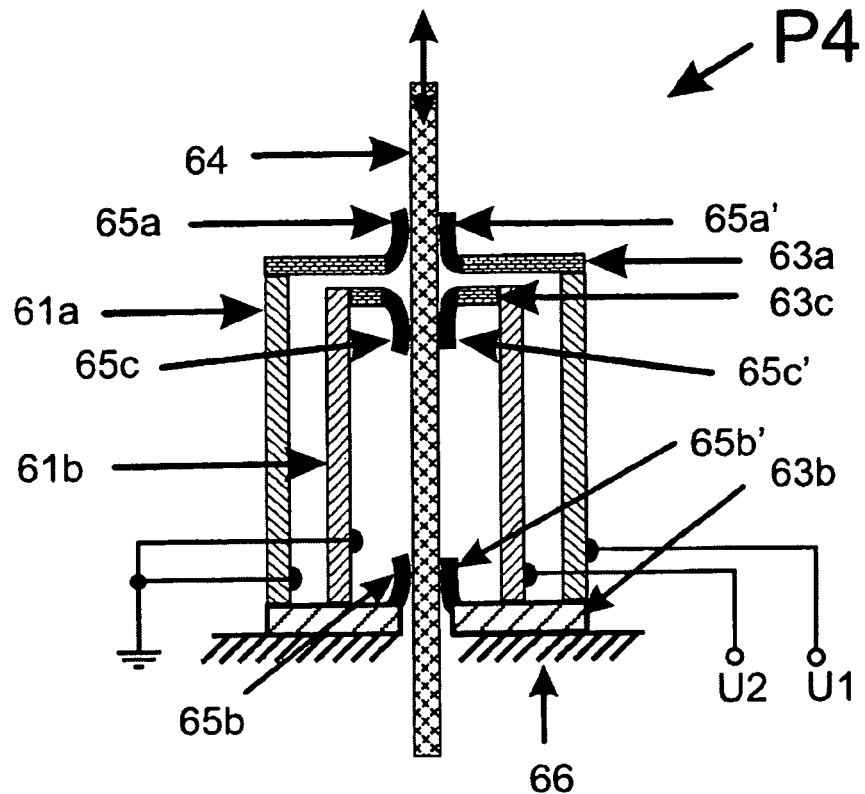
FIG. 6: shows two tubular piezo elements (top) that are disposed inside one another and are electrically insulated from one another, for forming the device P4 and a voltage curve (bottom) for the particularly uniform positioning of a slider without shaking.
Figure 6:
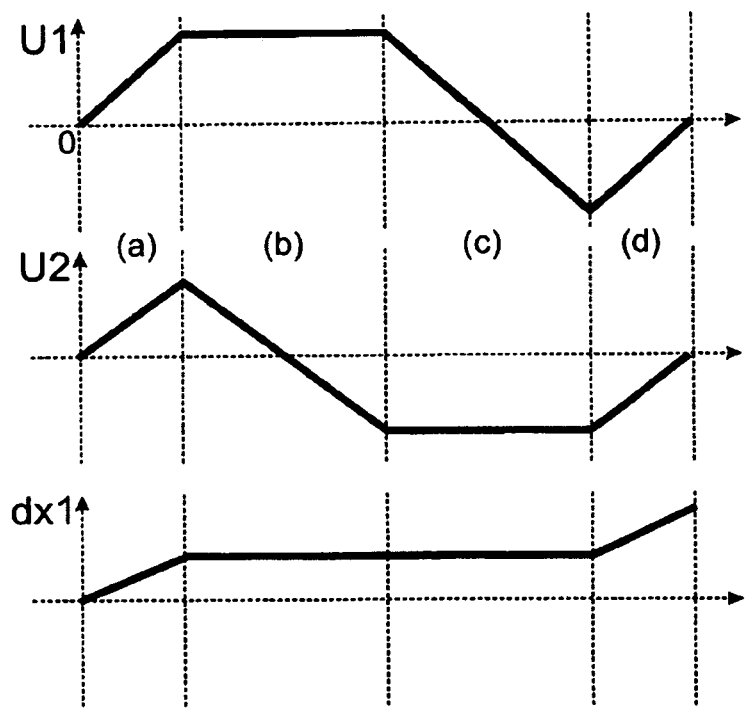

A piezo element from PI Ceramic GmbH, Lederhose, Germany, having a total length of 12 millimeters, is used in FIGS. 1 to 6 as the tubular piezo element 11, 21, 31, 41, 51*a* and 51*b*, 61*a* and 61*b*. In the devices for the electromechanical positioning of a slider of FIGS. 1 to 4, the inertial movement is driven in each case by exactly one tubular piezo element 11, 21, 31, 41. FIGS. 5 and 6 show a different drive system.

The slider 14, 24, 34, 44, 54, 64, 74, 84 is cylindrical and comprises a tungsten wire measuring approximately 0.5 mm in diameter. It is used to dissipate the tunneling current and is moved in line with the double arrow.

The device P1, P2, P3, P4 of FIGS. 1 to 6 locally comprises, at the end of the piezo element, a ceramic disk 13, 23, 33, 43, 53*a* and 53*c*, 63*a* and 63*c* having an opening, as the connecting element. The disk is glued to the end of the piezo element. The other end of the piezo element is glued to a base plate 46. Alumina ceramic material is used for the disk. The inside diameter of the opening of the terminal disk is 1.2 millimeters, the thickness is 1 millimeter and the diameter is 3 millimeters.

A tubular coaxial mount 12, 22, 32, 42 is glued to the lower part of the portion of the disk that projects into the interior of the device P1, P1, so as to be parallel to the interior of the piezo element and the slider. This mount comprises aluminum or a ceramic material. The coaxial mount 12, 22, 32, 42 has a total length of 10 mm. The inside diameter is likewise 1.2 millimeters. The mount 12, 22, 32, 42 is glued into the respective sleeve 13, 23, 33, 43 with an acrylate-based contact adhesive.

Figure 1:
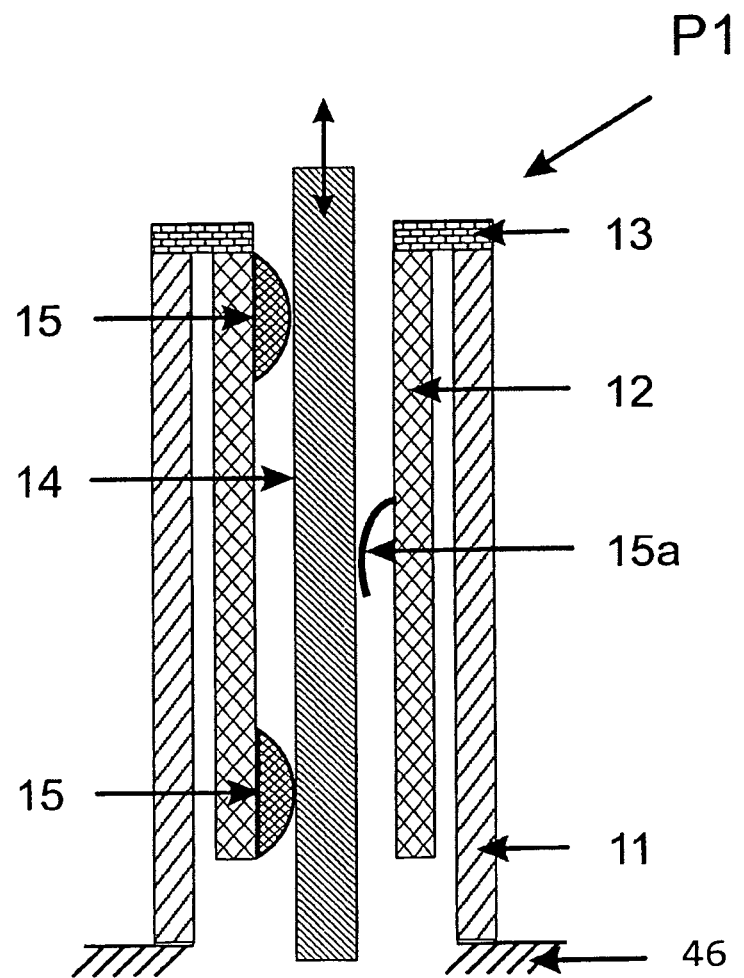
FIG. 1: is a first exemplary embodiment of a device P1 comprising a curved, elastic means 15*a* and four static friction means 15.

First Exemplary Embodiment (FIG. 1)

The sectional view in FIG. 1 shows only one of the two static friction means 15 in the upper and the lower axial position. In fact, two static friction means are arranged in each of the two axial positions. Both friction means in an axial position are in turn each disposed azimuthally uniformly relative to the elastic friction means 15*a* at the center axial position, so as to effect precise axial guidance of the slider. All 5 friction means are fastened to the piezo element at an axial position by means of the connecting element 13, and thus form a single group of friction means.

In FIG. 1, the elastic friction means 15*a* is glued in place at the axial center of the coaxial mount 12. The additional immovable, static friction means are connected to the tubular piezo element 11 directly via the coaxial mount 12 and via the disk 13. They are made of glued-on sapphire hemispheres 15.

Thus a total of five friction means have been used to guide the slider 14 in the axial direction in a stable manner, of which only four static friction means 15 are disposed in two different axial positions of the coaxial mount. In the present example, only the two friction means on the left in the image are indicated with reference numeral 15. It goes without saying that, given the selected sectional view, an additional sapphire hemisphere is disposed in the plane of each of the upper and lower sapphire hemispheres 15, these additional hemispheres together being disposed in azimuthally uniform manner relative to the friction means 15*a*.

The device P1 ensures that the full travel of the piezo element is transferred to the slider 14.

Figure 2:
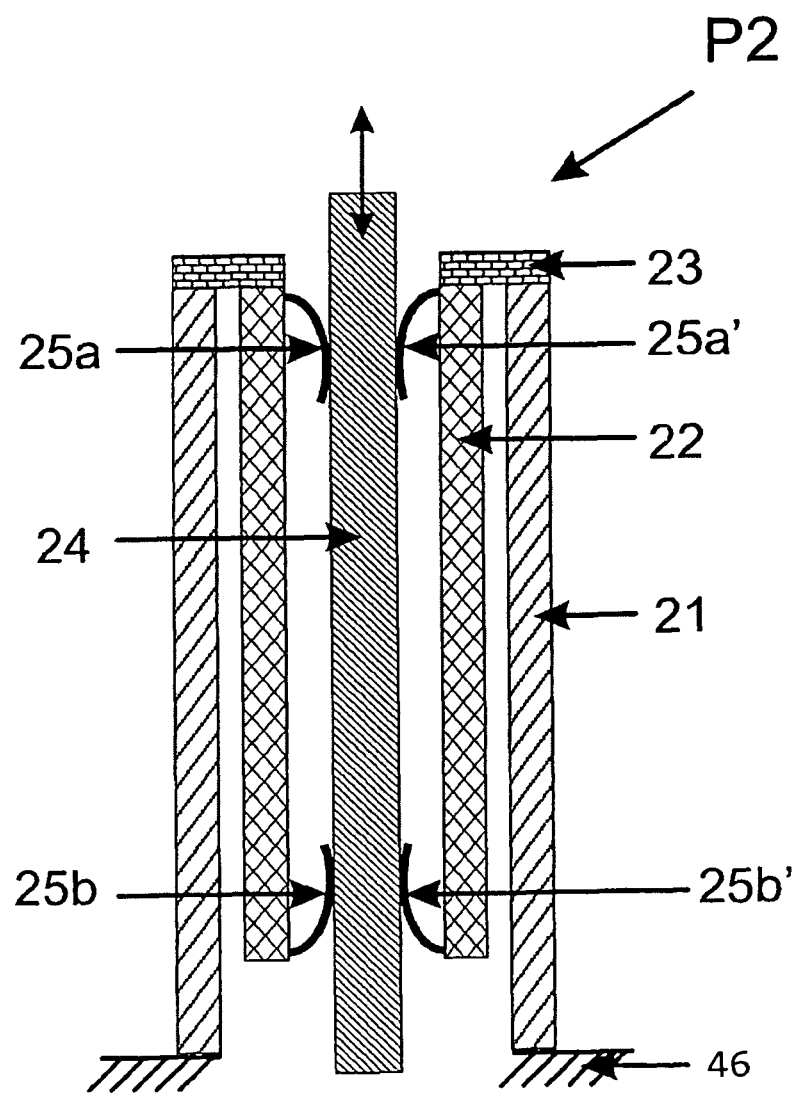
FIG. 2: is a second exemplary embodiment of a device P2 having two plug connections comprising curved, elastic means 25*a*, 25*b* and semicircular elastic guide surfaces 25*a'*, 25*b'*.

Second Exemplary Embodiment (FIG. 2)

In exemplary embodiment 2, two resilient means 25*a* and 25*a'* are provided in the upper axial position and two additional resilient means 25*b* and 25*b'* are provided in the lower axial position, for exerting a normal force on the slider 24. These resilient means 25*a* and 25*a'* are formed by a plug connection for wires. The plug connector comprises an elastic spring 25*a*, 25*b* and a resilient semicircular frictional surface 25*a'*, 25*b'* against which the slider is pressed by the spring force during operation.

The plug connector 25*a*, 25*a'* is connected to the disk 23 at an end, and thus to the piezo element 21. The connector 25*b*, 25*b'* is fastened to the free end of the tubular coaxial mount 22, and thereby is connected to the piezo element 21. All 4 friction means are fastened to the piezo element in an axial position by means of the connecting element 23 and thus form a single group of friction means.

The device P2 ensures that the full movement of the piezo element is transferred to the slider 24, and also ensures very good axial guidance of the slider.

In this embodiment, the slider can be particularly well stabilized against deviations from the axial direction of movement.

Use 1 of the Device P2 (FIG. 3):

FIG. 3 shows an instance of an application of the device P2 of FIG. 2 with a slider 34 that axially has various cross-sectional surfaces. The larger cross-sectional surface 37 in the center of the slider acts as a stopper so as to limit the movement of the slider in the axial direction. Because of this additional mass 37 between the support points of the means 35a, 35a', and 35b, 35b' and the related greater force of inertia, greater forces can be applied during positioning and thus, for example, larger masses can be positioned. Instead of such a slider, it is also possible to use a non-cylindrical slider, which is cut away along the axial direction so as to prevent azimuthal rotation of the slider during the axial translational movement.

As an alternative, a conical slider may also be moved. This slider can be used, for example, in order to design different velocities in the two axial directions, forward and back.

Use 2 of the Device P2 (FIG. 4):

The positioning unit P2 of FIG. 2 described above can be used as the core of a scanning probe microscope, as is shown in FIG. 4.

An object O is disposed above the tip S of the slider 44. For this purpose, the object holder H, together with the object O, is screwed into a cylinder Z. The cylinder Z surrounds the device P2 comprising the tubular piezo actuator 41. Both the cylinder Z and the device P2 are glued to a base plate 46. The scanning probe S is moved closer to the sample O using a sawtooth voltage and contraction and expansion of the tubular piezo element 41. The xy movement of the probe S over the sample can then take place in the known manner, with the tubular piezo element 41 comprising an outer electrode that is divided into four segments. This arrangement sets forth a very small and stable scanning probe microscope. Advantageously, the scanning probe S and the slider 44 are two independent parts. The scanning tip S is particularly easy to replace, without replacing the slider 44. The intermediate piece 48 receives the tip holder 47.

The electromechanical positioning unit P2 described can also be operated in the reverse manner as follows: The slider 44 is connected to the large mass of a base plate at least on one end. Then, the piezo element, which now is not connected to the base plate, is moved relative to the fixed slider.

As an alternative, the device P1 of FIG. 1 can be used instead of device P2 in two additional embodiments.

Figure 7:
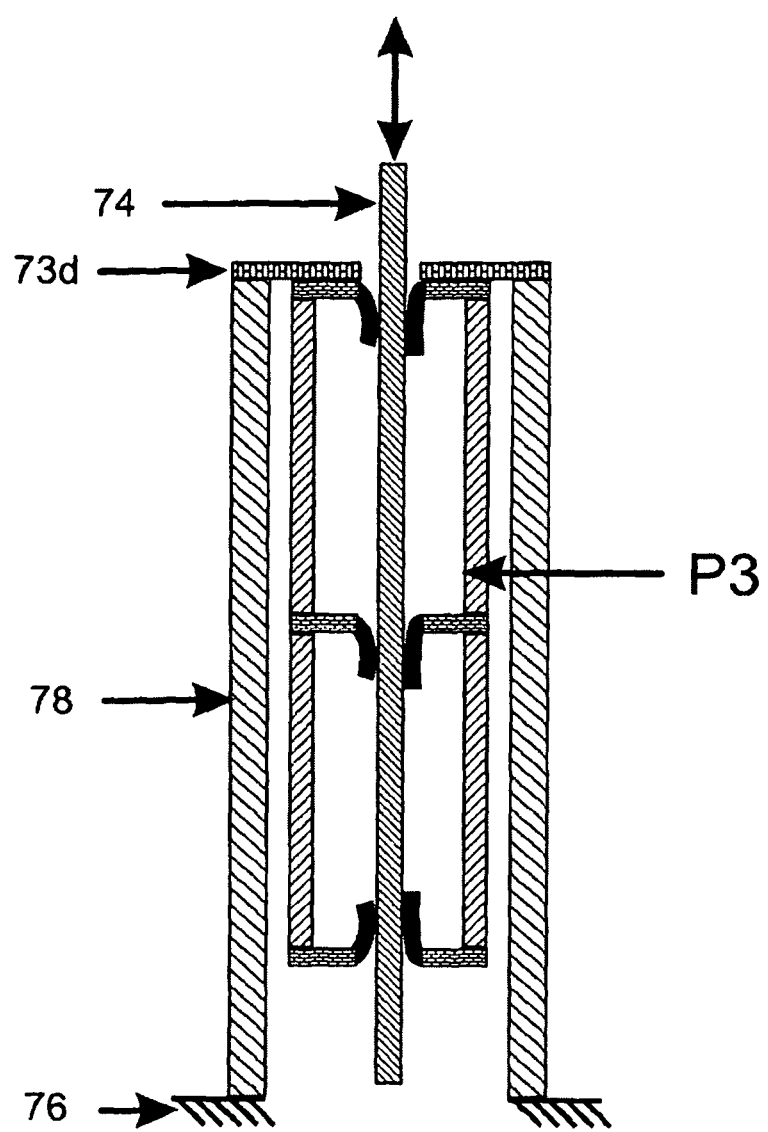
FIG. 7: is a device P3 comprising two tubular piezo elements disposed one after the other, as they are shown in FIG. 5, which are disposed inside a tubular piezo element 78, for scanning.
Figure 8:
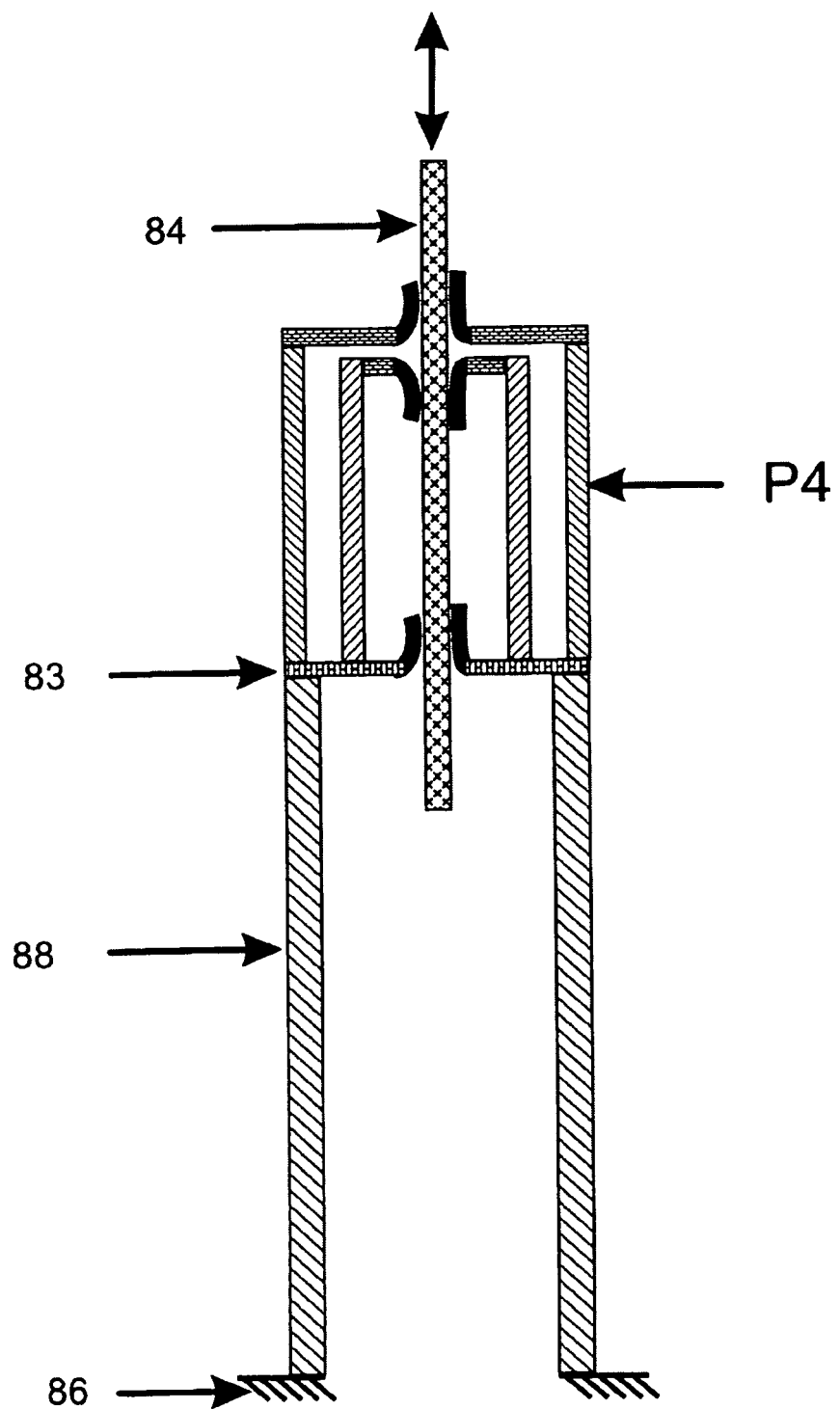
FIG. 8: is a device P4 comprising two tubular piezo elements disposed inside one another, as they are shown in FIG. 6, which are disposed on a tubular piezo element 88 having the same outside diameter, for scanning.

The two devices P3 and P4 shown in FIG. 5 and in FIG. 6 describe a method that is different from the inertial drive described hereabove. In FIG. 5, two piezo elements 51a and 51b have been consecutively connected to one another by a terminal disk 53b, which has an opening and serves as the connecting element. In contrast, in FIG. 6, two piezo elements having different diameters and lengths have been connected to one another via the terminal disk 63b, which serves as the connecting element. FIGS. 7 and 8 show the application of the devices according to FIG. 5 and FIG. 6 in scanning probe microscopes.

Unless provided otherwise, the dimensions and materials of the individual parts used for the device P2 in FIG. 2 are identical to those of the devices P3 and P4 of FIGS. 5 and 6.

Exemplary Embodiment 3 (FIG. 5)

FIG. 5 shows the device P3 at the top, and a method according to the invention for operating this device therebelow.

P3 comprises two piezo elements 51a and 51b, which are connected axially one after the other by means of the connecting element 53b.

At the outer opposing ends, each of the two piezo elements 51a and 51b is provided with a terminal disk, which serves as the connecting element 53a, 53c. The tubular piezo elements are further axially connected to one another by an additional disk 53b. One of the tubular piezo elements 51a is fastened at the free end thereof to the support 56, while the opposing end of the second piezo element is not fastened.

The slider 54 is axially positioned in line with the double arrow. The slider is held, guided and moved by the three groups of friction means 55a, a', 55b, b' and 55c, c'. The group 55a and 55a' is formed by a plug connection and comprises the two spring elements opposing one another on the connecting element 53a.

The group 55b, b' comprises the two spring elements opposing one another on the connecting element 53b. The group 55c, c' comprises the two spring elements opposing one another on the connecting element 53c.

Two of the groups 55a, a' and 55c, c' are fastened to the two outer ends of the two connected tubular piezo elements 51a and 51b. As an alternative, the group of the spring elements 55a and 55a' can also be fastened directly to the base plate 56.

In order to move the cylindrical slider 54 relative against the support 56, a group 55b, b' or 55c, c' is moved relative to the other two groups, which in turn are at rest relative to one another, by the piezo elements 51a and 51b. In the process, the two other groups, which are not moving relative to one another, hold the cylinder by the static friction force thereof. The static friction of the third group, which is moving relative to the other two groups, is less than the sum of the static friction forces of the other two groups. Thus, the contact of this group with the slider transitions to kinetic friction.

As differs from the prior art according to U.S. Pat. No. 4,874,979 A1, in which two clamps are actively clamped and loosened by the piezoelectric drive, the design according to the invention involves passive clamping. In order for the slider to follow a synchronous movement of two groups relative to the third group, the sum of the static friction forces of the groups that are moved together must always be greater than the static friction force of the individual group. The contact with the slider 54 then transitions into kinetic friction at the individual group, while the force of the individual group is not sufficient to overcome the limit static friction force of the two other groups that are moved together.

If $F\_i$ is the minimal force that must be applied to urge the group i to slide, the following must apply to the three groups 55a, a' and 55b, b' and 55c, c': $F\_i+F\_j>F\_k$, where i, j, k=55a, a', 55b, b', 55c, c' and i≠j≠k.

A period of a voltage curve at the piezo elements 51a and 51b will be described hereafter, which results in travel of the slider to the right in the image area (see FIG. 5). It is assumed here that a positive voltage at the respective piezo element causes expansion of the same along the cylinder axis and that a negative voltage causes contraction.

A period of movement starts in the state in which both piezo elements 51a and 51b are de-energized and at rest.

In segment (a) of the voltage curve (see FIG. 5, bottom detail), the first piezo element 51a contracts (negative voltage) and the second piezo element 51b expands (positive voltage). This results in kinetic friction at the center group 55b, b' to the left. The position of the right group 55c, c' does not change because the piezo element 51a is shortened, while the piezo element 51b is extended, so that in net terms no change occurs in the position of the right group 55c, c' in relation to the base plate, nor is there change in the left group 55a, a', which never moves relative to the base plate 56. The two static groups hold the slider 54, while the third center group 55b, b' transitions into kinetic friction relative to the slider and moves to the left.

In the second segment (b) of the voltage curve of FIG. 5, the expansion of the left piezo element 51a remains unchanged, which is to say contracted. The left group 55a, a' and the center group 55b, b' thus do not move relative to the base plate 56 of the nanomanipulator, and thus they hold the slider 54 with approximately twice the static friction force. While the right piezo element 51b moves from maximally expanded to maximally contracted, the right group 55c, c' slides to the left relative to the slider 54, which is held by the left group 55a, a' and the center group 55b, b'.

In the third segment (c), the piezo element 51a is expanded. The center group 55b, b' and the right group 55c, c' are thus moved together to the right and the slider 54 follows. At the left group 55a, a', the contact with the slider 54 transitions into kinetic friction. In this segment, the slider moves to the right.

The fourth segment (d) is similar to the first segment. The first piezo element 51a contracts and the second piezo element 51b expands. This results in kinetic friction at the center group 55b, b' to the left, until both piezo elements are again in the de-energized starting state.

The pattern of movement can be summarized as follows: First, the center group 55b, b' and the right group 55c, c' move individually to the left. In the process, the slider 54 does not move. It is always held by the other two groups. Then, the center group 55b, b' and the right group 55c, c' together move to the right and the slider 54 follows along, moving to the right. Within a period of movement, the slider of the nanopositioner is moved to the right by a distance that corresponds to the stroke of a piezo element from maximum voltage to minimum voltage.

Movement to the left is performed with inverted voltage curves.

Varying piezo lengths can be compensated for by an accordingly adjusted voltage amplitude, by making the stroke of the friction means 55b, b' the same as the stroke of the friction means 55c, c'.

Fourth Exemplary Embodiment (FIG. 6)

FIG. 6 shows the device P4 at the top, and the voltage curve for a method according to the invention for operating this device therebelow.

P4 comprises two piezo elements 61a, 61b that are axially disposed inside one another by means of the connecting element 63b. The piezo element 61a has a larger outside diameter of 6 mm and a length of 13 millimeters, so that it can receive the piezo element 61b.

The two piezo elements 61a and 61b of the device P4 are provided with a connecting element 63a and 63c at each of the outer, identically oriented ends, wherein the openings of the disks are axially disposed directly on top of one another, so that the slider 64 can be moved axially therein.

The tubular piezo elements 61a and 61b are connected to one another at the ends thereof toward the base plate of the nanopositioner by a connecting element, for example a disk 63b, which serves as the connecting element. Both tubular piezo elements 61a and 61b are fastened at this end to a base plate 66 of the positioner, while the respective opposing end of each piezo element is not fastened, and is directed toward the object (not shown).

The slider 64 is axially positioned in line with the double arrow. The slider is held, guided and moved by the three groups of spring elements 65a, a' and 65b, b' and 65c, c'.

The openings of the three disks 63a, 63b and 63c are disposed axially on top of one another so that the slider can be axially positioned therein.

Two of these groups 65a, a' and 65c, c' are disposed at the outer ends of the joined piezo elements 61a and 61b, while the third group 65b, b' is provided further away from the two other groups on the connecting element 63b, which connects two piezo elements to one another.

In order to move the cylindrical slider 64 relatively with respect to the support 66, a group 65a, a' or 65c, c' is moved relative to the other two groups, which in turn are at rest relative to one another, by way of the piezo elements 61a and 61b. In the process, the two other groups, which are not moving relative to one another, hold the cylinder by the static friction force. The static friction of the third group, which is moving relative to the other two groups, is less. Thus, the contact of this group with the slider transitions to kinetic friction.

This is, once again, a design involving passive clamping. In order for the slider to follow a synchronous movement of two groups relative to the third group, the sum of the static friction forces of the groups that are moved together must always be greater than the static friction force of the individual group. The contact with the slider 64 then transitions into kinetic friction at the individual group, while the force of the individual group is not sufficient to overcome the limit static friction force of the two other groups that are moved together.

If $F\_i$ is the minimal force that must be applied to prompt the group i to slide, the following must apply to the three groups 65a, a' and 65b, b' and 65c, c': $F\_i+F\_j>F\_k$, where i, j, k=65a, a', 65b, b', 65c, c' and i≠j≠k.

A period of a voltage curve at the piezo elements 61a and 61b will be described hereinafter, which results in travel of the slider toward the top in the image area (see FIG. 6). It is assumed here that a positive voltage at the respective piezo element 61a and 61b causes expansion of the same along the cylinder axis and that a negative voltage curve causes contraction.

A period of the movement starts in the state in which both piezo elements 61a and 61b are de-energized and at rest.

In the segment (a) of the voltage curve, the outer piezo element 61a and the inner piezo element 61b expand (positive voltage in each case). This results in static friction at the center group 65c, c' and at the upper group 65a, a', while the two piezo elements 61a and 61b expand upward. The position of the lower group 65b, b' does not change with respect to the position on the base plate 66. At the frictional surfaces between the spring elements 65b and 65b' and the slider, the slider transitions into kinetic friction and moves upward relative to the base plate 66. The two moved groups hold the slider 64, while the slider transitions into kinetic friction relative to the lower third group 65b, b'.

In the second segment (b) of the voltage curve of FIG. 6, the expansion of the outer piezo element 61a remains unchanged. The inner piezo element 61b contracts due to the negative voltage curve. The group 65c, c' thus transitions into kinetic friction and moves downward, while the upper group 65a, a' and the lower group 65b, b' do not move relative to the base plate 66 and thus hold the slider 64 based on approximately twice the static friction force. While the inner piezo element 61b moves from maximally expanded to now maximally contracted, the group 65c, c' slides downward relative to the slider 64, which is held by the two groups 65a, a' and 65c, c'.

In the third segment (c), the outer piezo element 61a is contracted. Thus the group 65a, a' alone is transferred into kinetic friction and moved downward relative to the slider. The slider remains unchanged on the z-coordinate thereof due to the higher forces at the two other groups 65b, b' and 65c, c'. On the upper group 65a, a', the contact with the slider 64 transitions into kinetic friction. In this segment, the slider does not move.

The fourth segment (d) is similar to the first segment. Both piezo elements 61a and 61b expand due to the positive voltage curve. This causes the slider 64 to follow upward. The position of the lower group 65b, b' does not change based on the position on the base plate 66. At the frictional surfaces between the spring elements 65b and 65b' and the slider, the slider transitions into kinetic friction and moves upward relative to the base plate 66. The pattern of movement can be summarized as follows: First, the two upper groups 65a, a' and 65c, c', each comprising two elastic bending elements, move upward together. The slider 64 follows this movement. Then, these two groups consecutively move downward individually, with the slider 64 remaining in place unchanged. Within a period of movement, the slider of the nanopositioner is moved upward by the distance that corresponds to the stroke of a piezo element from maximum voltage to minimum voltage.

Varying piezo lengths can be compensated for by an accordingly adjusted voltage amplitude by making the stroke of the friction means 65a, a' the same as the stroke of the friction means 65c, c'.

Use 1 of Device P3 from FIG. 5 (FIG. 7):

The aforementioned positioning unit P3 in FIG. 5 can be used as the core of a scanning probe microscope. For this purpose, the device P3 of FIG. 5 is mounted inside a tubular piezo element 78 having a larger diameter, the piezo element being installed on a base plate 76. The device P3 is fastened to the end of the outer piezo element 78 by means of a holder 73d. A scanning probe can then be attached at the upper end of the slider 74 and a sample above the scanning probe can be scanned.

A continuous movement in the xy direction is possible by way of quadruple segmentation of the piezo element 78 along the longitudinal axis.

The piezo element 78 can also be used for precision movement in the z-direction by continuously varying the voltage at the piezo element 78.

Use 1 of Device P4 from FIG. 6 (FIG. 8):

The aforementioned positioning unit P4 of FIG. 6 can be used as the core of a scanning probe microscope. For this purpose, the device P4 of FIG. 6 is mounted on a tubular piezo element 88 having the same diameter, the piezo element being installed on a base plate 86. The device P4 is fastened to the end of the piezo element 88 by means of a holder 83. A scanning probe can be attached at the upper end of the slider 84 and a sample above the scanning probe can be scanned.

A continuous movement in the xy direction is possible by way of quadruple segmentation of the piezo element 88 along the longitudinal axis.

The piezo element 88 can also be used for precision movement in the z-direction by continuously varying the voltage at the piezo element 88.

Each of the devices P1 to P4 can also constitute the core of a scanning probe microscope alone. To this end, the precision movement in the xy and z directions can be achieved by applying continuous voltage to the piezo elements.

The invention claimed is:

1. A device comprising:
    a slider;
    at least one tubular piezo element for the electromechanical positioning of the slider within the piezo element along a longitudinal axis of the piezo element; and
    at least one elastic friction means having a frictional surface in contact with a first surface portion of the slider for exerting a permanent, constant normal force on the surface of the slider; and
    wherein said elastic friction means is configured to maintain said frictional surface in contact with said first surface portion during said positioning of the slider, including during relative movement of the slider with respect to said frictional surface of said elastic friction means, said contact exhibiting kinetic friction during said relative movement and exhibiting static friction when there is no said relative movement during said positioning; and
    wherein the friction means is connected to the piezo element.

2. The device according to claim 1, further comprising at least one static, non-elastic friction means for absorbing the normal force that is exerted on the slider, the static, non-elastic friction means being connected to the piezo element.

3. The device according to claim 1, wherein the at least one elastic friction means, which are fastened at a position along the longitudinal axis of the piezo element, form a group of friction means.

4. A device according to claim 1, further comprising at least one connecting element connecting the elastic friction means to the piezo element.

5. A device according to claim 4, wherein the connecting element comprises a disk having an opening, wherein the disk is connected at an end to the piezo element and at least one friction means is fastened to the disk.

6. A device according to claim 1, further comprising at least one coaxial, tubular mount which serves as the connecting element, wherein the mount is connected to the piezo element at an end and at least one friction means is fastened to the mount.

7. A device comprising two tubular piezo elements for the electromechanical positioning of a slider within the interior along the longitudinal axis of the piezo elements, said two piezo elements being disposed one after the other, or inside one another, and are electrically insulated from one another, and at least three groups of friction means, which are fastened to the piezo elements along the longitudinal axis of the tubular piezo elements in varying positions, wherein the friction means, which are fastened at positions on the piezo element, form a group of friction means, wherein at least one group comprises an elastic friction means comprising a frictional surface always in contact with a first surface portion of the slider for exerting a permanent, constant normal force on the surface of the slider, and wherein said elastic friction means is configured so that during said electromechanical positioning of said slider, said constant normal force where said frictional surface of said elastic friction means contacts said first surface portion of the slider results in kinetic friction during relative motion between the slider and said elastic friction means and results in static friction when there is no said relative movement.

8. The device according to claim 7, wherein at least the group disposed in the center, comprises an elastic friction means.

9. A method for positioning a slider using a device according to claim 7, in which a voltage curve is applied to the electrodes of the two piezo elements, such that a contraction or expansion of the piezo elements results in positioning of the slider along the longitudinal axis of the tubular piezo elements, wherein, in a segment of the voltage curve, a group of friction means is moved, and during this movement the slider is held by two other groups of friction means, and in a further increment of the voltage curve, two groups of friction means are moved simultaneously and the slider follows the movement thereof.

10. A device comprising:
- at least one tubular piezo element for the electromechanical positioning of a slider within the piezo element along the longitudinal axis of the piezo element;
- at least one elastic friction means having a frictional surface in contact with a first surface portion of the slider for exerting a permanent, constant normal force on the surface of the slider, which is suited for positioning the slider by way of alternating kinetic friction and static friction at said contact with said first surface portion of the slider, the friction means being connected to the piezo element;
- at least one coaxial, tubular mount which serves as the connecting element, wherein the mount is connected to the piezo element at an end and at least one friction means is fastened to the mount; and
- wherein each one of said at least one coaxial, tubular mount is located concentrically inward of the tubular piezo element between the piezo element and the slider.

11. A device comprising:
- a tubular piezo element;
- a slider positioned concentrically internal to the tubular piezo element along a longitudinal axis of the tubular piezo element; and
- an elastic friction element connected to the tubular piezo element and comprising a frictional surface that is positioned to be in contact always with the slider, so as to exert a normal force on an abutting surface of the slider; and
- wherein the piezo element is configured to electromechanically position the slider along the longitudinal axis in response to a voltage drive signal, and the frictional surface maintains contact with the slider both in presence and absence of voltage of said voltage drive signal;
- wherein the elastic friction element is configured to respond to movement of the tubular piezo element while maintaining said contact with the slider at said frictional surface so as to alternate between a static friction state at said contact, during which the slider moves with both the tubular piezo element and the elastic friction element, and a kinetic friction state at said contact, during which said slider slides relative to said frictional surface of said elastic friction element and tubular piezo element to change axial position of the slider.

12. A device according to claim 11, further comprising a static friction element comprising a frictional surface that is positioned to always be in contact with the slider without regard to voltage of the voltage drive signal and to exert a normal force on an abutting surface of the slider, wherein the static friction element is configured to maintain said contact with the slider during changing voltage of the voltage drive signal so as to alternate between a static friction state at said contact, during which the slider moves with both the tubular piezo element and the static friction element, and a kinetic friction state at said contact, during which said slider slides relative to said static friction element and the tubular piezo element to change axial position of the slider.

13. A device comprising:
- a tubular piezo element;
- a slider positioned concentrically internal to the tubular piezo element along a longitudinal axis of the tubular piezo element;
- an elastic friction element connected to the tubular piezo element and comprising a frictional surface that is positioned to be in contact always with the slider, so as to exert a normal force on an abutting surface of the slider; and
- a coaxial, tubular mount located concentrically inward of the tubular piezo element between the tubular piezo element and the slider, said mount serving to connect the elastic friction element to the tubular piezo element, said elastic friction means being fastened to said mount; and
- wherein the piezo element is configured to electromechanically position the slider along the longitudinal axis in response to a voltage drive signal, and the frictional surface maintains contact with the slider both in presence and absence of voltage of said voltage drive signal; and
- wherein the elastic friction element is configured to respond to movement of the tubular piezo element while maintaining said contact with the slider so as to alternate between a static friction state at said contact, during which the slider moves with both the tubular piezo element and the elastic friction element, and a kinetic friction state at said contact, during which said slider slides relative to said elastic friction element and tubular piezo element to change axial position of the slider.

* * * * *